United States Patent [19]

Bykhovsky et al.

[11] 4,163,402

[45] Aug. 7, 1979

[54] METHOD OF MACHINING WORKPIECES AFTER PREHEATING

[76] Inventors: David G. Bykhovsky, ulitsa Esenina, 32, korpus 2, kv. 95, Leningrad; Konstantin P. Alexeev, ulitsa Truda, 15/5, kv. 16, Kolpino Leningradskoi oblasti; Viktor S. Kunin, Lesnoi proezd, 34/36, kv. 80; Valery M. Vassin, ulitsa Michurinskaya, 1, kv. 132, both of Leningrad; Valentin N. Nesterov, ulitsa Proletarskaya, 93, kv. 28; Vladimir A. Alexandrov, ulitsa Zapadnaya, 14, kv. 35, both of Kolpino Leningradskoi oblasti; Eduard R. Fomin, ulitsa Engelsa, 38, kv. 44, Zhdanov Donetskoi oblasti, all of U.S.S.R.

[21] Appl. No.: 889,569

[22] Filed: Mar. 23, 1978

[51] Int. Cl.[2] .................. B23B 3/00; B23C 1/00; B23C 9/00
[52] U.S. Cl. ..................................... 82/1 C; 409/64; 409/288
[58] Field of Search ............ 82/1 C; 90/11 C, 24 C; 219/69 M

[56] References Cited

U.S. PATENT DOCUMENTS

| 2,600,453 | 6/1952 | Weingart | 82/1 C |
| 4,098,153 | 7/1978 | Clark et al. | 82/1 C |

FOREIGN PATENT DOCUMENTS

| 229311 | 5/1926 | United Kingdom | 82/1 C |

OTHER PUBLICATIONS

"Hot Machining" by I. A. Dicker, from Mechanical Engineering Magazine, Jan. 1964, pp. 37-41.
"Machining with a Plasma Jet" by J. A. Browning, from Metalworking Production, Sep. 12, 1962, pp. 82 & 83.

*Primary Examiner*—Harrison L. Hinson
*Attorney, Agent, or Firm*—Haseltine, Lake & Waters

[57] ABSTRACT

A method of machining a workpiece after preheating consists in that the workpiece material to be removed by a cutting tool is subjected immediately before the removal operation to intense localized heating and notching by a plasma jet, with a groove being formed on the surface to be machined. To this end, a plasma torch is positioned ahead of the cutting tool so that the angle between the direction of the cutting speed and the plasma jet axis ranges from 0 to 45 degrees, and the angle between the direction of feed of the cutting tool and the plasma jet axis from 10 to 45 degrees.

4 Claims, 5 Drawing Figures

METHOD OF MACHINING WORKPIECES AFTER PREHEATING

BACKGROUND OF THE INVENTION

1. Field of the Invention

The present invention relates to metal working, and more specifically to methods of machining workpieces after preheating them. The invention can be adapted for application in machining cast and forged ingots and billets, in particular those having a hard skin of casting or made of hard-to-machine alloys, especially high-manganese or nickel-based alloys, as well as in machining workpieces having their surfaces coated with various wear-resistant materials.

2. Description of the Prior Art

An increase in strength of construction materials is known to impair their machinability. Hardness of alloys employed nowadays in mechanical engineering practice is as high as 60 HRC, while the hardness of cutting tools is 80 to 90 HRC. Any further increase in strength properties of the tool is physically impracticable. Therefore, new methods are sought for to enable machining of materials possessing a hardness comparable to that of a turning tool to be effected with the tool now in practice.

A method of machining workpieces after preheating is known (cf. accepted British application No. 1,351,140), wherein the workpiece material to be removed by a cutting tool is subjected immediately before the removal operation to intense localised heating using a plasma torch. The output of the plasma torch is set such that the temperature of the portions of the material to be removed by the cutting tool is raised to a level at which the strength of the material is reduced to permit the tool to cut satisfactorily. Argon is used as a plasma-forming gas in the plasma torch.

Despite a number of advantages offered by plasma heating of the workpiece to be machined, including its simplicity, high density of heat flux, and a small size of the cutting tool, this prior art method described has a limited application in that it fails to provide, among other things, a high efficiency of machining materials of increased hardness. This is due to the fact that such materials exhibit a very low heat conductivity, and after a particular heat flux intensity has been reached, further heating of the material does not bring about any increase in its temperature at the depth of feed. A higher cutting speed, in this case, results in a lower depth of the heated layer, requiring lower tool feed rates and hence decreasing the machining operation efficiency.

Nor is this prior art method efficient enough in turning cast and forged billets with a non-uniform mass distribution about their axis of rotation, which may be the reason for destruction of the lathe, when such billets are machined at high cutting speeds. Therefore, such billets are generally roughed at low speeds of rotation, and in this case, in order that a high efficiency may be obtained, an increased feed rate of the cutting tool is desirable, causing a nonheated or underheated material to be cut. Moreover, the casting skin of such billets frequently has nonmetallic inclusions embedded therein whose strength properties remain unchanged with heating.

SUMMARY OF THE INVENTION

It is an object of the present invention to provide a method of machining a workpiece after preheating, which makes it possible to increase the efficiency of machining hard steels and alloys as a result of reducing the force of cutting.

Another object of the present invention is to provide a method of machining a workpiece after preheating, ensuring a longer service life of the tool employed.

With these and other objects in view, there is provided a method of machining a workpiece after heating, wherein a portion of the workpiece material to be removed by a cutting tool is subjected immediately before the removal operation to intense localised heating by a plasma jet to a temperature at which the strength of material being machined is reduced wherein, according to the invention, the plasma torch is positioned ahead of the cutting tool so that the angle between the direction of cutting speed and the axis of the plasma jet is up to 45 deg., whereas the angle between the direction of feed of the cutting tool and the axis of the plasma jet ranges from 10 to 45 deg., with the result that under the action of the plasma jet the workpiece material is nothced to form a groove on the surface of cutting.

The advantages of the invention reside in that the surface of the workpiece being machined is not only heated by the plasma jet but is also notched by the latter prior to being machined by the tool. The range of setting angles of the plasma torch, as indicated hereinabove, provides for the optimum operating conditions. If the angles are smaller than those indicated, the plasma cutting process will be inefficient, and with greater angles, the material melted by the plasma jet may impinge on the machined surface. The better efficiency obtained when machining workpieces in accordance with the present invention results from the following circumstances.

In the first place, the groove formed on the workpiece surface being machined allows an increase in the depth of heating the material in the direction of feeding the cutting tool, since the plasma jet penetrates into the groove and more heat is applied to the material due to a larger area through which the heat is introduced. In addition, the groove formed on the surface of cutting tends to reduce the cross-sectional area of the layer to be removed by the tool and contributes to easy deformation of the ship, thus relieving the tool of stress. The tool is further stress-relieved owing to the groove producing stress riser on the surface being machined, with a consequent decrease in the force of cutting.

The aforementioned advantages of the method according to the invention enable the machining process to be more extensively controlled.

The groove may be positioned on different portions of the work surface being machined, and may vary in size, depending on the properties of the material processed.

Sometimes, it is advisable, throughout the machining process, that the distance between the edge of the groove, nearest the cut surface, and the cut surface itself be maintained within 0.5 to 2 mm, the width "a" of the groove within $0.1^C \leq a \leq 0.8^C$ (where "C" is the width of the surface of cutting), and the depth "b" of the groove within $0.15^S \leq b \leq 0.9^S$ (where "S" is the feed rate of the cutting tool per revolution or per stroke). The groove of a smaller size will not have any noticeable effect on the heating of the material and on the cutting force values, while with a larger-sized groove, the cut surface may be damaged, or else the material impinging on the tool may be overheated, causing the cutting edge thereof to be destroyed.

Alternatively, throughout the machining process, the depth of the groove may be at least 1.2 times the feed rate of the tool per revolution or per stroke, the width of the portion of the surface of cutting between the machined surface and the groove not exceeding 0.8 times the width of the portion on the surface of cutting between the surface to be machined and the groove.

This can be accounted for by the fact that, for a smaller depth of the groove, the cutting edge will lie at all times within the area of the material heated up to its melting point, resulting in the damage of the edge. The relative widths of the portions of the surface of cutting separated by the groove are determined by different forces exerted on the respective parts of the cutting edge engaging these portions on the surface of cutting, as will be shown in the detailed description of the invention.

The groove may also cover a portion of the surface to be machined in the direction of feed for a depth equal to at least twice the feed rate per revolution or per stroke.

A smaller depth of the groove in a workpiece of low thermal conductivity materials prevents accumulation of the required quantity of heat in the layer being removed.

The invention is further illustrated by the detailed description of the embodiments thereof with reference to the accompanying drawings, wherein:

DETAILED DESCRIPTION OF THE INVENTION

Figure 1:
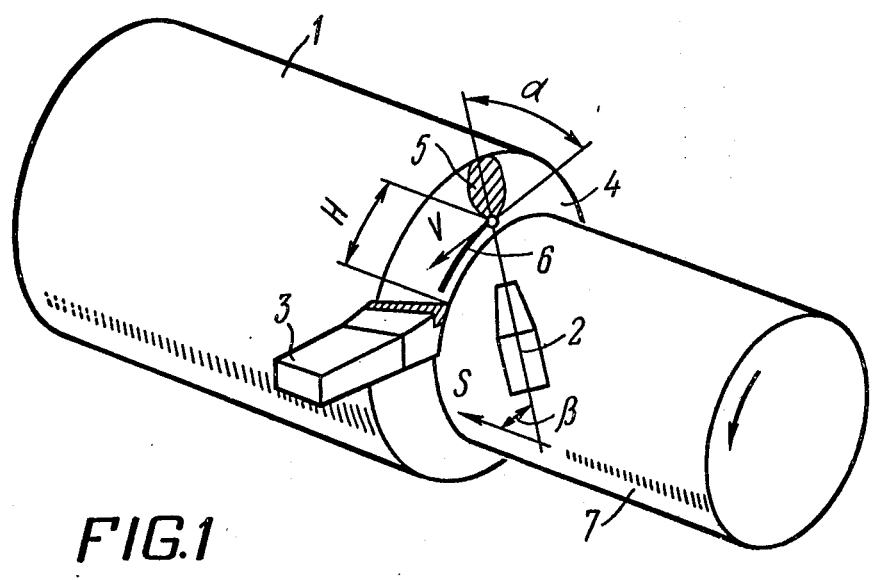
FIG. 1 is a diagram showing relative positions of a plasma torch and a cutting tool in the process of machining a workpiece after preheating, according to the invention.

A workpiece 1 (FIG. 1) is machined using a plasma torch 2 and a tool 3, for example, on a turning lathe (not shown). The plasma torch 2 is positioned ahead of the cutting tool 3 on the same sliding carriage (not shown) where the cutting tool is fixed, so that, depending on the size and material of the workpiece 1 to be machined, the feed rate of the cutting tool 3, the depth of cut, and the operating mode of the plasma torch 2, the angle $\alpha$ between the direction of the cutting speed V and the axis of the plasma jet of the plasma torch 2 ranges from 0 to 45 deg., while the angle $\beta$ between the axis of the plasma jet of the plasma torch 2 and the direction of feed "S" of the cutting tool 3 is in the range of from 10 to 45 deg. The distance H in cm, between the tip of the tool 3 and intersection point of the axis of the plasma torch 2 and a surface 4 of cutting is adjusted within $0.01V \leq H \leq 10 V$, where V is the cutting speed in cm/s, selected according to the cutting speed and the output of the plasma torch 2 employed.

By means of the plasma jet of the plasma torch 2, the material of the workpiece 1 on a portion 5 of its surface 4 of cutting is heated to a temperature at which the strength of the material of the workpiece 1 is reduced. Moreover, under the action of the plasma jet, the material of the portion 5 of the surface 4 of cutting is notched, and as the workpiece 1 is rotated, fresh portions of the material are effected by the plasma jet, causing a groove 6 to be formed on the surface 4 of cutting ahead of the cutting tool 3. The layer of the material together with the groove 6 is then removed by the tool 3.

The notching of the material on the surface 4 of cutting is provided by an appropriate adjustment of the power of the plasma torch 2 and the angles $\alpha$ and $\beta$ within the limits specified. With the angle $\alpha$ above 45 deg. and/or the angle $\beta$ above 45 deg., the material melted by the plasma jet gets onto a cut surface 7. On the other hand, with the angle $\beta$ below 10 deg., the plasma cutting process proves to be inefficient.

To carry the method of the invention into effect a plasma torch is used with air as a plasma-forming gas. A variety of plasma torches may be adapted to be employed, such as those disclosed in the U.S. Pat. No. 3,597,649. Adoption of air as a plasma-forming gas ensures the maximum possible increase in the machining efficiency due to the following unexpected fact ascertained by the inventors.

With respect to roughing conditions, in the cases where the depth of cut is at least two to three times the feed rate, the maximum speed of cutting without preliminary heating is less than the speed of air-plasma cutting of sheets with a thickness equal to the feed value.

It has been found that the speed V of air-plasma cutting of a steel sheet may amount to a value expressed by the following relationship:

$$V = 13.2/b \text{ cm/s},$$

where b is the thickness of the sheet, in cm. The process of forming the groove 6 on the surface 4 of cutting by means of a plasma jet may be regarded as plasma cutting, and therefore, when realizing the method of machining workpieces after preheating according to the invention, cutting speeds can be additionally increased at will.

For example, whereas conventional machining of workpieces made of high-manganum steel alloys is generally performed, without preheating, at a speed of $V = 20$ m/min $= 33$ cm/s, with a feed rate $S = 1.5$ m/rev, the use of the above relationship makes it possible to obtain the depth "b" of the groove 6 formed by the plasma jet, at a given cutting speed:

$$b = 13.2/V = 13.2/33 = 0.39 \text{ cm} = 3.9 \text{ mm}$$

Thus the depth of the groove so formed exceeds the feed rate $S = 1.5$ mm/rev. As a consequence, the ship removed by the cutting tool 3 will be divided into two portions, which results in reduction of the cutting forces acting on the cutting tool 3, and hence in its longer service life for a given cutting speed.

Another embodiment of the invention allows for raising the cutting speed or the feed rate, the service life of the tool 3 being the same as in the case of machining workpieces without preheating.

The size of the groove 6 and its position on the surface 4 of cutting are governed by the heat and temperature conductivity of the material to be machined, by the optimum cutting temperature of the material in question, and by the distribution of its strength properties over the width of the surface 4 of cutting.

Figure 2:
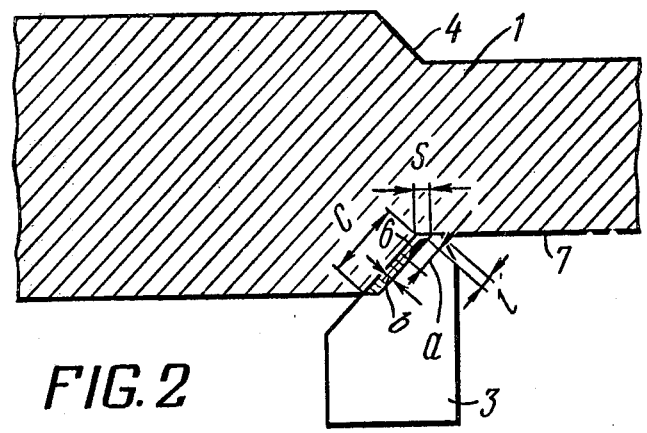
FIG. 2 is a longitudinal section of a workpiece being machined according to one embodiment of the invention.

FIG. 2 shows a longitudinal section of the workpiece 1 machined in accordance with one embodiment of the method of the present invention, preferably used in case the material to be machined exhibits a sufficiently high thermal conductivity, and when the maximum permissible stress on the cutting tool 3 is restricted to the tip thereof. The distance "1" between the edge of the groove 6 nearest the machined surface 7 and this surface 7 is maintained throughout the machining process within 0.5 to 2 mm depending on the depth of cut and the desirable surface finish. The width "a" of the groove 6 is kept within $0.1^C \leq a \leq 0.8^C$, where "C" is the width of the surface 4 of cutting, and the depth "b" of the groove 6 is within $0.15^S \leq b \leq 0.95^S$, where "S" is the feed of the cutting tool 3 per revolution (for turning operation) or per stroke (for planing operation).

Figure 3:
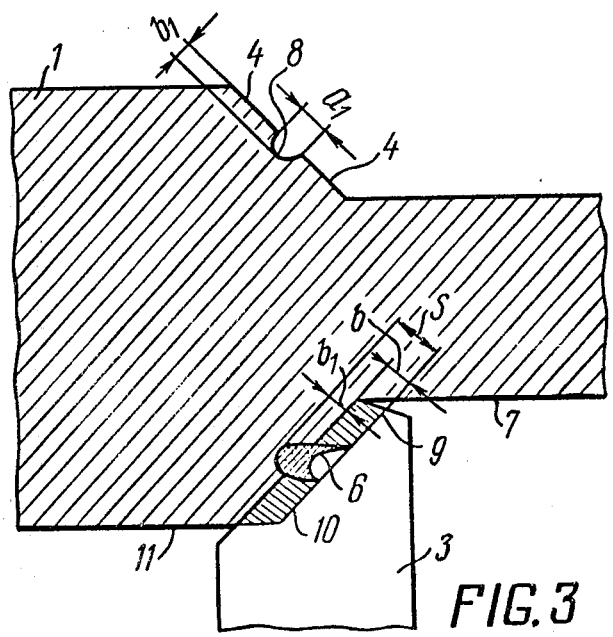
FIG. 3 is a longitudinal section of a workpiece being machined according to another embodiment of the invention.

FIG. 3 shows a longitudinal section of the workpiece machined in accordance with another embodiment of the invention, used in machining heat-proof steels and alloys. The depth "b" of the groove 6 is at least 1.2 times the feed "S" per revolution (for turning operation) or per stroke (for planing operation). After the passage of the tool 3, a groove 8 of a depth "$b_1$" and a width "$a_1$" is left behind on the surface 4 of cutting. The groove 6 divides the surface 4 of cutting into two portions 9 and 10, so that the width of the portion 9 of the surface 4 of cutting between the machined surface 7 and the groove 6 is not more than 0.8 times the width of the portion 10 of the surface 4 of cutting between the groove 6 and a surface 11 to be machined.

The depth "b" of the groove 6 exceeding the feed value "S" per revolution or stroke allows the chip removed by the tool 3 to be divided into two parts with the consequent reduction of the force acting on the cutting tool 3 due to an appreciable decrease in the cross-sectional area of the chip removed. The portion of the cutting edge of the tool 3 used in turning the portion 10 of the surface 4 of cutting will be working in the free-cutting mode. The resulting total force acting on the cutting edge is substantially reduced. The value of depth of the groove 6 exceeding the feed rate per revolution or stroke is determined by the fact that, with a smaller depth of the groove 6, the width $a_1$ of the groove 8 left on the surface 4 of cutting after the cutting tool 3 has passed, would be very small, and some stray metal drops left in the groove would stick to the cutting face of the tool 3 causing it to be melted and destroyed.

The position of the groove 6 on the surface 4 of cutting is determined, first, by the fact that the force acting on one portion of the cutting edge of the tool 3, engaging the portion 9 of the surface 4 of cutting and operating in the non-free cutting mode, is invariably more than the force acting on the other portion of the cutting edge engaging the portion 10 of the surface 4 of cutting and operating in the free cutting mode, and secondly, by the fact that it is necessary to supply heat and to heat the metal cut by the tip of the tool 3, where the heat exchange is considerably greater than in the metal adjacent the surface 11 to be machined.

After the surplus metal has been removed by the cutting tool 3 on the surface 4 of cutting, the groove 6 is not completely removed together with the surplus, and the remaining portion 8 thereof is exposed to the plasma jet of the plasma torch 2 with the next revolution or stroke (FIG. 1) which deepens it up to an appropriate depth. By a proper choice of the operating mode of the plasma torch 2, the cutting speed, and the angles α and β, the machining is performed so that the depth $b_1$ of the groove 8 (FIG. 3) left on the surface 4 of cutting after the passage of the cutting tool 3 is maintained constant throughout the machining process, and the position of the groove 6 on the surface 4 with respect to the machined surface 7 remains unaltered.

Figure 4:
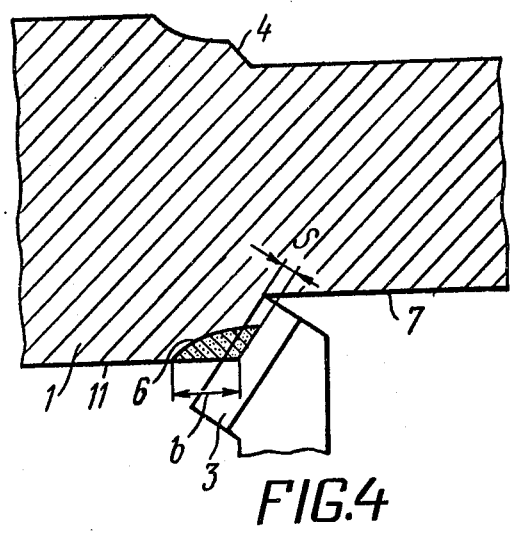
FIG. 4 is a longitudinal section of a workpiece being machined according to still another embodiment of the invention.

When machining cast parts, particularly centrifugally cast pipes, the maximum stress on the cutting edge of the tool 3 will be produced by the upper surface layer which generally contains a great quantity of sand or other abrasive inclusions. In such cases, the groove 6 (FIG. 4) is so positioned that it covers a portion of the surface 11 to be machined for a depth, in the feeding direction of the cutting tool 3, equal to at least twice the feed S per revolution or stroke.

Figure 5:
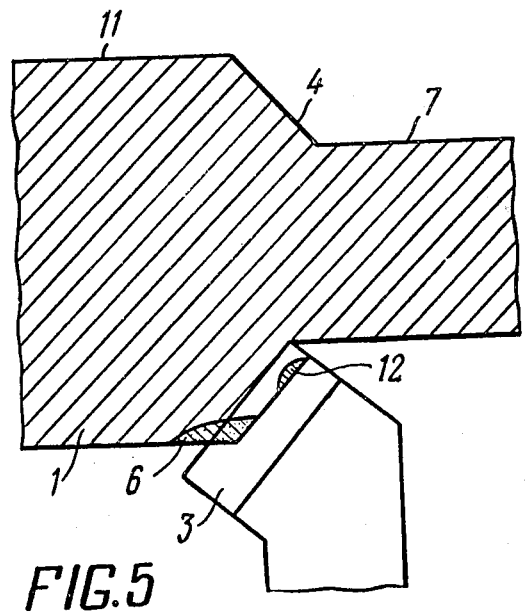
FIG. 5 is s longitudinal section of a workpiece with a wider surface being machined according to the method of the invention.

In case the surface 4 of cutting is sufficiently wide, for example, as wide as 25 to 40 mm, and it is impossible to effect a thorough heating of the zone adjacent the tip of the cutting tool 3 with the air of the groove 6 covering a portion of the surface 11 to be machined, another groove 12 (FIG. 5) is formed on the surface 4 of cutting, positioned similarly to, and having the same dimensions as those indicated for the groove 6 when referring to FIG. 2.

EXAMPLE 1

The method of the invention was tested in roughing cylindrical ingots of low-carbon boiler steel, using the technique of vacuum-arc remelting. The ingots were 1350 mm in diameter, about 5000 mm long, and had the mass of 41 to 42 tons. The skin of casting on the surface of the ingots contained up to 30 percent manganum. The method was realized using the plasma torch type ПBP-402 (as disclosed in the U.S. Pat. No. 3,547,649). The plasma torch was set at an angle α=7 deg., β=17 deg. (FIG. 1), at a distance H=370 mm. The arc current was 250 A, the arc voltage being 190 V. On the surface of cutting with its width varying from 15 mm to 20 mm as a result of a non-uniform machining allowance, a groove of 10 mm wide and 0.5 mm deep was formed. The feed rate of the hard-alloy tool was 2.5 mm/rev, the cutting speed was 30 m/min, and the average life of the tool was 57 min.

EXAMPLE 2

When machining similar ingots of low-alloy steel, a plasma torch of ПBP-1 type was used. It was set at an angle α=42 deg and β=38 deg., at a distance H=350 mm. The arc current was 270 A, and the arc voltage, 170 V. On the surface of cutting 7 to 10 mm in width, there was formed a groove 2 mm wide and 1.8 mm deep. The feed rate of the hard-alloy tool was 2.5 mm/rev. The cutting speed was 25 m/min, and the average life of the cutting tool was 50 min.

EXAMPLE 3

When machining similar ingots of stainless steel OX18H10T, a plasma torch of ПBP-402 type was used. It was positioned at an angle α=15 deg., β=29 deg., at a distance of H=370 mm. The arc current was 250 A, and the arc voltage, 180 V. On the surface of cutting 12 to 15 mm wide, a groove was formed, 7 mm wide and 1.2 mm deep. The feed rate of the hard-alloy cutting tool was 2.5 mm/rev. The cutting speed was 34.5 m/min, and the average life of the cutting tool was 75 min.

EXAMPLE 4

The method of the invention was tested in turning ingots of nickel alloy XH67BMTЮ, 300 mm in diameter and 1700 mm long. A plasma torch type ПBP-402 was positioned at an angle $\alpha=12$ deg. and $\beta=32$ deg., at a distance of H=270 mm. The arc current was 250 A, and the arc voltage, 180 V. On the surface of cutting, 10 to 12 mm wide, a groove was formed, 2.5 deep and 6 mm wide. The feed rate of the hard-alloy cutting tool was 1.75 mm/rev. The cutting speed was 12 m/min, and the life of the tool was 60 min.

EXAMPLE 5

The method of the invention was tested in machining a centrifugally cast pie of the 4OX27H4A alloy, 700 mm in diameter and with a wall 120 mm thick. There was a layer of metal sintered with quartz sand, 3 to 5 mm deep, on the surface of the pipe. A plasma torch type ПBP-402 was set at an angle $\alpha=15$ deg. and $\beta=27$ deg., at a distance of H=430 mm. The arc current was equal to 300 A, and the arc voltage was 180 V. Formed on the surface of cutting was a groove covering the surface to be machined, which groove was 5 mm wide and 2.5 mm deep in the feeding direction. The cutting speed was 11 m/min, with the rate of feed being 1.03 mm/rev. The life of the hard-alloy tool was 120 min.

Thus, it will be seen from the aforementioned examples that the method according to the invention provides for a more efficient machining process, aside from a considerable saving in cutting tools.

It is to be understood that the present invention is not restricted to the above described specific embodiments thereof, and other modifications and variations of the invention are possible without departing from its true spirit and scope as disclosed in the following claims.

What is claimed is:

1. A method of machining a workpiece after preheating, comprising
    positioning of a plasma torch ahead of a tool so that the angle between the direction of cutting speed and the axis of plasma jet of said plasma torch is up to 45 deg., and the angle between the direction of feed of said tool and the axis of plasma jet of said plasma torch ranges from 10 to 45 deg.;
    heating and notching the workpiece material on the surface of cutting thereof to form a groove under the action of the plasma jet of said plasma torch; and
    removing by said cutting tool the material of said workpiece, subjected to the action of plasma jet.

2. A method of machining a workpiece after preheating according to claim 1, wherein the distance between the edge of said groove nearest the cut surface and the cut surface is maintained throughout the machining surface within 0.5 to 2 mm, the width "a" of said groove is maintained within $0.1^C \leq a \leq 0.8^C$, where "C" is the width of said surface of cutting, and the depth "b" of said groove is held within $0.15^S \leq b \leq 0.9^S$, where "S" is the feed rate of said cutting tool per revolution or per stroke.

3. A method of machining a workpiece after preheating according to claim 1, wherein the depth of said groove is throughout the machining process at least 1.2 times the feed of said cutting tool per revolution or per stroke; the width of the portion of said surface of cutting between the machined surface and said groove does not exceed 0.8 times the width of the portion of said surface of cutting between the surface to be machined and said groove.

4. A method of machining a workpiece after preheating according to claim 1, wherein said groove covers a portion of the surface to be machined for a depth, in the direction of feed of said cutting tool, equal to at least twice the feed of said cutting tool per revolution or per stroke.

* * * * *